(12) United States Patent
Milek et al.

(10) Patent No.: US 6,208,953 B1
(45) Date of Patent: Mar. 27, 2001

(54) METHOD FOR MONITORING PLANTS WITH MECHANICAL COMPONENTS

(75) Inventors: Janusz Milek, Zürich; Heinz Guettinger, Schaffhausen, both of (CH)

(73) Assignee: Sulzer Innotec AG, Winterthur (CH)

( * ) Notice: Subject to any disclaimer, the term of this patent is extended or adjusted under 35 U.S.C. 154(b) by 0 days.

(21) Appl. No.: 09/006,925

(22) Filed: Jan. 14, 1998

(30) Foreign Application Priority Data

Jul. 31, 1997 (EP) .................................................. 97810550

(51) Int. Cl.$^7$ ...................................................... G06G 7/48
(52) U.S. Cl. .................................... 703/7; 703/2; 702/34; 702/35
(58) Field of Search .................. 395/500.23, 500.28; 702/33–35, 183; 706/911–912; 703/183, 2, 7; 9706/912; 700/20, 2

(56) References Cited

U.S. PATENT DOCUMENTS

| | | |
|---|---|---|
| 4,609,992 | 9/1986 | Bray . |
| 5,210,704 | * 5/1993 | Husseiny ................................ 702/34 |
| 5,465,321 | * 11/1995 | Smyth ..................................... 706/20 |
| 5,631,851 | * 5/1997 | Tanaka et al. ........................... 702/33 |
| 5,633,800 | * 5/1997 | Bankert et al. ......................... 702/33 |
| 5,748,496 | * 5/1998 | Takahashi et al. ...................... 702/35 |
| 5,748,508 | * 5/1998 | Baleanu ................................. 702/33 |
| 5,796,920 | * 8/1998 | Hyland .................................. 706/20 |
| 5,825,645 | * 10/1998 | Konar et al. ............................ 700/28 |

FOREIGN PATENT DOCUMENTS

| | | |
|---|---|---|
| 146 359 | 2/1981 | (DD) . |
| 3133222A1 | 3/1983 | (DE) . |
| 4243882C1 | 1/1994 | (DE) . |
| 0002232A2 | 6/1979 | (EP) . |
| 0205764A2 | 12/1986 | (EP) . |
| 0516534A1 | 12/1992 | (EP) . |
| 2 676 556 | 11/1992 | (FR) . |
| WO 90/16048 | 12/1990 | (WO) . |

OTHER PUBLICATIONS

Milne et al.;"Tiger: Real–time Situation Assessment of Dynamic Systems", Intelligent Systems Engineering, vol. 3, Issue 3, 103–124, Oct. 1994.*

(List continued on next page.)

Primary Examiner—Kevin J. Teska
Assistant Examiner—Douglas W. Sergent
(74) Attorney, Agent, or Firm—Townsend and Townsend and Crew LLP

(57) ABSTRACT

In a method for monitoring plants with mechanical components, measured values ($x_{iT}$; $x_{iu}$) are determined at predeterminable time intervals for a fixed set of parameters ($x_i$). The measured values ($x_{iT}$) which are determined for various working points during a modelling phase are used for the generation of a model for the operating behavior of the components. With the help of the model for the operating behavior at least one monitoring value (r; $s_{nu}$) is derived at predeterminable time intervals which is independent of the respective current working point. The temporal behavior of the monitoring value (r; $s_{nu}$) is used for estimating the wear in the components and/or for the detection of operating disturbances.

12 Claims, 3 Drawing Sheets

OTHER PUBLICATIONS

Trave–Massuyes et al.;"Gas–turbine Condition Monitoring Using Qualitative Model–Based Daignosis", IEEE Expert, vol. 12, Issue 3, pp. 22–31, Oct. 1997.*

Hong et al.;" Knowledge–based Diagnostic System of Trubine with Faults Using the Blackboard Model", IEEE International Conference on Intelligent Processing Systems, 1997, vol. 2, pp. 1516–1519, Oct. 1997.*

Chen et al., "An On–line Information Processing Method for Intelligent Control Systems", Proc. 34th IEEE Conf. on Decision and Control, vol. 1, pp. 745–750, Dec. 1995.*

Hafez et al., "Machine Learning for Model–Based Diagnosis", Proceedings of the 1997 American Control Conf., vol. 1, pp. 42–46, Jun. 1997.*

Caminhas et al., "A Neurofuzzy Approach for Fault Diagnosis in Dynamic Systems", Proc. of the Fifth International Conf. on Fuzzy Systems, vol. 3, pp. 2032–2037, Sep. 1996.*

Georgescu et al., "Optimal Adaptive Predictive Control and Fault Detection of Residential Building Heating Systems", Proc. of the Third IEEE Conference on Control Applications, vol. 3, pp. 1601–1606, Aug. 1994.*

Cooper et al., "Distrubance Pattern Classification and Neuro–Adaptive Control", IEEE Control Systems Magazine, vol. 12, Issue 2, pp. 42–48, Apr. 1992.*

* cited by examiner

METHOD FOR MONITORING PLANTS WITH MECHANICAL COMPONENTS

BACKGROUND OF THE INVENTION

1. Field of the Invention

The invention relates to a method for monitoring plants with mechanical, in particular hydromechanical, components.

2. Description of the Prior Art

For industrial applications, for example, for the generation of electrical energy, complex plants which comprise a large number of components are often used. As a representative example reference is made in the following to a hydroelectric power plant in which turbines are driven by means of hydraulic force for the generation of electrical energy. In this example, the hydromechanical components are thus the turbines, which are set rotating by flowing water and which drive the generators.

From the points of view of safety and economy, it is very important to continuously monitor such plants and their components during operation in order to detect disturbances in the operation, that is, deviations from normal operating behavior, as early and reliably as possible. Often a plurality of parameters such as, for example, pressure, temperatures of the water at different positions in the plant, flow rates, speeds of rotation, powers, bearing temperatures etc., are determined by measurement and e.g., stored and/or graphically displayed as a function of time. Usually, however, components such as turbines do not operate at a fixed operating or working point, so that the temporal behavior of the measured values to be determined for monitoring exhibits pronounced fluctuations even in normal, that is, disturbance-free operation. Therefore, it is very difficult to judge on the basis of the temporal behavior of the measured values—if at all—whether the plant is operating correctly, free of disturbance. In addition, it is difficult to detect and to judge very slow temporal variations such as arise, for example, through operational wear.

In principle, it would indeed be possible to model the entire plant physically, that is, to calculate the physical relationships between the individual parameters, and then to perform an assessment of the operating state through a comparison between such physical model calculations and the values determined by measurement. In practice, however, this way is frequently too cost-intensive and laborious so that it is poorly suited for industrial applications in particular. One reason for this is that industrial plants have an enormous complexity with numerous components in mutual interaction so that a moderately reliable physical model must take a large number of relationships between the individual parameters into account, through which its generation becomes an extremely difficult, time consuming and cost-intensive task.

Therefore, it is customary in practice for the monitoring of the plant, in particular, for industrial applications, to predetermine fixed threshold values for several selected parameters, for example, the temperature in the bearing of a rotating shaft or the temperature of a coolant, on exceeding which an alarm is triggered or a warning is issued. This kind of monitoring has disadvantages however. There is namely the danger that operational disturbances or faults actually existent in the plant are overlooked or detected too late. Thus, it is possible, for example, that a bearing of a shaft or a seal has a defect, but that the monitored temperature does not exceed the threshold value required for triggering the alarm because the turbine is momentarily operating only at a low load. On the other hand, it is possible for false alarms to be triggered, for example, when the turbine briefly operates at a very high load, so that the threshold value required for triggering the alarm is exceeded with out a defect being present. A false alarm of this kind can lead to the plant being switched off without it actually being necessary, which is very disadvantageous, in particular, from the economic point of view.

SUMMARY OF THE INVENTION

Starting from this state of the art it is thus an object of the invention to provide a method for monitoring plants with mechanical, in particular hydromechanical, components which does not have the disadvantages mentioned. The method should enable a reliable and early detection of operation disturbances and be suitable for industrial applications. The method should, in particular, be suitable for the monitoring of those plants and/or components which are operated at variable working points. The method should also permit a simple assessment of the operating state of the components. It should furthermore be possible with this method to detect temporally slowly progressing changes, such as e.g., are caused by wear. In addition, the method should enable trends for the further operation of the components to be recognized.

The method for monitoring plants with mechanical, in particular hydromechanical, components which can be operated at variable operating point s satisfying this object is characterized by the features of the independent claim. The method in accordance with the invention thus comprises the following steps:

During the operation of the components, measured values are determined at predeterminable time intervals for a fixed set of parameters. The measured values which are determined for various working points during a modelling phase are used for the generation of a model for the operating behavior of the components, with the input variables of the model being at least a portion of the set of parameters and with the output values comprising a model value for at least one of the parameters. A residue is formed in each case by comparison of the respective model value with the corresponding actual measured value of the modelling phase. The model is optimized by the determination of model parameters in such a manner that a modelling error which can be derived from the residues is a minimum. With the help of this model for the operating behavior at least one monitoring value which is independent of the respective current working point is derived at predeterminable intervals. The temporal behavior of the monitoring value is used for estimating the wear in the components and/or for the detection of operating disturbances.

Since the model for the operating behavior is generated and optimized on the basis of experimentally determined measured values which are determined during the operation of the unit, elaborate and difficult determinations of the physical relationships between the individual parameters are not necessary, so that the method in accordance with the invention is suitable for industrial uses in particular.

The method in accordance with the invention makes use of a monitoring variable which is independent of the respective current operating point, which means that fluctuations in the measured values for the parameters which are based merely on changes in the operating point do not lead to significant changes in the monitoring variable. The method thus takes into account the mutual influence between the parameters at varying working points. In other words, this means that the monitoring method in accordance with the invention does not operate with fixed threshold values for definite parameters, but rather that the threshold values are adapted to the respective current operating state. This permits a very reliable and early detection both of operating disturbances and of slowly progressing changes such as are caused, for example, by wear. The triggering of false alarms and the "overlooking" of operating disturbances, e.g. in operation at partial load, practically no longer arises in the method in accordance with the invention. This is advantageous, in particular, from the point of view of economy and safety. Through the reliable monitoring, unnecessary standstill times of the plant can be avoided and the maintenance costs significantly reduced.

Since the monitoring variable is independent of the respective current working point, a substantially temporally constant value results for it as long as the plant and/or the components are operating without defect and wear. As soon as a change in the component caused by defect or wear arises, the monitoring variable deviates from its constant value. Thus, a deviation from the normal operating state is recognizable in a very simple manner on the basis of a graphic display of the monitoring variable as a function of time.

An updating for the determination of a current model in which the measured values determined since the last updating are taken into account is preferably done by means of an evaluation and storage apparatus at predeterminable time intervals. It is hereby ensured that in each case the most recent measured values enter into the monitoring process.

Preferably the models, which are determined at different times, are in each case stored in the evaluation and storage apparatus together with characteristic values which are representative of the quality of the respective model. It is hereby possible to reconstruct the temporal development of the parameters even in retrospect. It is particularly advantageous in this procedure that a permanent storing of all the measured values which are determined can be dispensed with and only a highly reduced data set need be stored, namely in each case the model parameters or values from which the former can be determined and the characteristic values in order to enable a reconstruction of the history at a later time. The characteristic values can e.g. be correlation matrices and estimated variances of the measurement noise.

It is also preferred to take the older models into account, in particular in a weighted manner, during the updating for the determination of the current model. The temporal behavior, for example, of an arising disturbance or a wear, can thereby be better estimated.

In a preferred execution of the method, the respective current model is optimized by the evaluation and storage apparatus wherein for each of the measured values determined since the last updating of the model, a residue is calculated for the associated parameter through comparison with the model values corresponding to them, and the model parameters of the current model are determined in such a manner that the modelling error which can be determined from the residues is a minimum. This means that independently of whether operating disturbances arise or not, the model is always updated in such a manner that the actual most recently measured values are reconstructed as well as possible, and is consequently as good a representative as possible of the component to be monitored at all times. If operating disturbances arise, then this is intentionally incorporated into the model. The monitoring is advantageously carried out in this execution of the method as follows:

At least one reference working point is fixed. After each updating of the model, the associated model value for the fixed reference working point, the nominal value for the corresponding parameter, is determined by the evaluation and storage apparatus using the respective current model. The temporal behavior of the nominal value is used for the estimation of the wear in the components and/or for the detection of disturbances in the operation.

In this way of carrying out the method the monitoring variable is thus the temporal behavior of the nominal value which results from the fixed reference working point and the respective current model. If no changes (operating disturbances, wear) arise in the components to be monitored, then no substantial changes in the model parameters occur with the current updating of the model. As a consequence, the nominal value for the fixed reference working point is also substantially temporally constant. If, in contrast, changes in the components arise, then this leads to a change in the model parameters when updating them. The nominal value, which is determined for the fixed reference working point by means of the respective current model, also normally changes thereby. Thus, changes in the components can be very simply recognized on the basis of the temporal change of the nominal value. In addition, the rate of change of the nominal value can provide information on whether the change in the components is caused by an operating disturbance or by the effects of wear.

This execution of the method, in particular, also enables trends for the future operation of the components to be recognized from the temporal behavior of the nominal value.

The invention will be explained in the following in more detail with reference to examples and with reference to the drawings. Shown in the drawings are:

DETAILED DESCRIPTION OF THE PREFERRED EXEMPLARY EMBODIMENTS

The method in accordance with the invention is explained in the following with exemplary character with reference to a hydroelectric power plant with turbines. In this, the hydroelectric power plant acts as a representative example of a plant to be monitored and the turbines serve as an example for the hydromechanical components of the plant. It is evident that the invention is not restricted to cases of this kind. The components can also be other flow machines such as, for example, pumps or other mechanical systems such as steam turbines, steam boilers, compressors, generators, motors, transmissions. The plants in which components of this kind are integrated can, for example, also be heating plants, locomotives, weaving machines or plasma spray plants.

The term "parameters" is understood to mean those directly or indirectly measurable variables which are useful for the characterization of the operating state of the components of the plant or which have an influence on the operating state. For the concrete example of the turbine or of the hydroelectric power plant, the term, parameters, comprises for example, the following variables: the power, the pressure before and after the turbine, the water flow rate, the temperature of the water, the speed of rotation of the turbine, the temperature of the coolant, the temperature in the generator, the temperatures in the shaft bearings or seals, the sound emissions, vibrations, the blade positions etc. Several of the parameters can be influenced directly by the operating personnel, such as, for example, the amount of water flowing through the turbine; other parameters such as, for example, the temperature in the shaft bearing or in the shaft seal can, on the contrary, not be influenced directly. There are a large number of parameters which, however, are not all independent of one another, but are as a rule highly correlated.

The term "working point" or "operating point" is understood to mean that operating state at which the component or the plant is momentarily operating. Each combination of parameters which can be realized with the component or the plant corresponds to a working point. The totality of possible working points is designated as the operating field. Usually the working point of the component or the plant is predeterminable by the operating personnel wherein parameters which can be directly influenced are set to the desired value. If the turbine, for example, is running in a partial load operation, then it is operating at a different working point than in full load operation.

Figure 1:
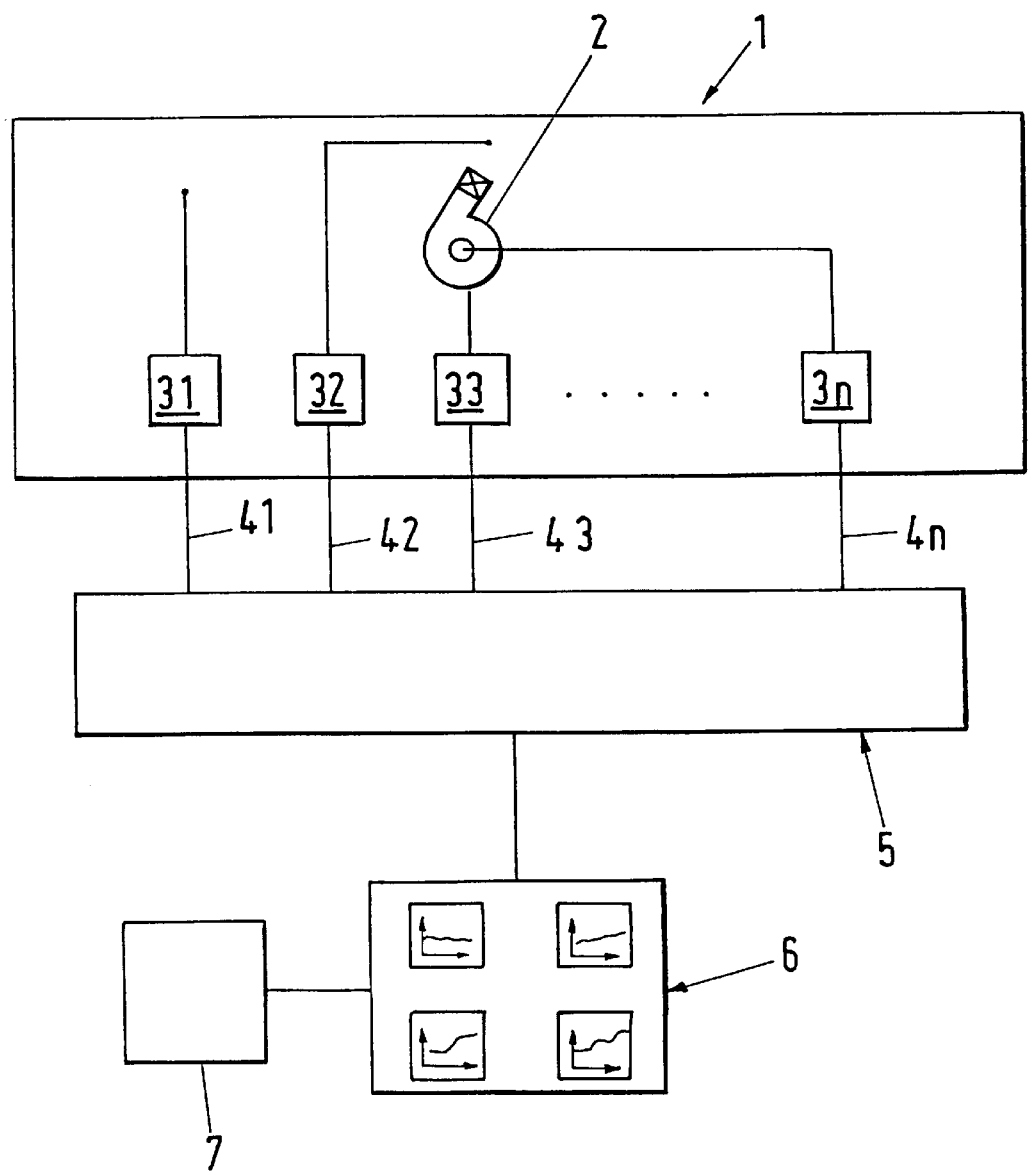
FIG. 1 is a block diagram of a plant in order to illustrate an exemplary embodiment of the method in accordance with the invention.

FIG. 1 shows a schematic block diagram of a plant 1 in order to illustrate an exemplary embodiment of the method in accordance with the invention. The plant 1 to be monitored is, for example, a hydroelectric power plant which contains turbines 2 as hydromechanical components. only one of the turbines 2 is symbolically indicated in FIG. 1 since this is sufficient for an understanding of the present teaching. Naturally, more than one turbine 2 is usually provided in the plant 1. In addition, a plurality of sensors 31, 32, 33, . . . , 3n are provided for the determination by measurement of the parameters $x_1, x_2, x_3, \ldots, m_n$. In this arrangement, not all parameters need be measured directly at the component 2, but rather parameters can also be measured at other parts of the plant, such as, for example, the pressure of the water in the pressure line. The choice of the parameters $x_1, x_2, x_3, \ldots, x_n$ which are determined by measurement depends on the type of the plant or component to be monitored. It is a matter of the experience of the expert to choose the parameters suitable for the respective application.

The sensors 31–3n transmit the data measured by them via signal lines 41, 42, 43, . . . , 4n, for example, optical fibre lines, to an evaluation and storage apparatus 5 where the data, after preparation or further processing where appropriate, are stored as measured values.

The parameters $x_1, x_2, x_3, \ldots, x_n$ form a set $X=(x_1, x_2, x_3, \ldots, x_n)$ of parameters. During the operation of the turbine 2, measured values $x_{1t}, x_{2t}, x_{3t}, \ldots, x_{nt}$ are respectively determined for the fixed set X of parameters at predeterminable time intervals, for example, every minute or every 10 minutes, by means of the sensors 31–3n and stored in the evaluation and storage apparatus. The measured value $x_{1t}$ designates the value that the parameter $x_1$ has at the time point t, or in general: the measured value $x_{it}$ with i=1, 2, 3, . . . , n, designates the value that the parameter $x_i$ has at the time point t. In this, the index t is equivalent to a running index which indexes the measured values which follow one another temporally.

A model A (FIG. 2) for the operating behavior of the components 2 is generated and evaluated by means of the evaluation and storage apparatus 5, as explained further below. At least one monitoring variable, which is independent of the respective current working point, is determined at predeterminable time intervals with the help of the model A. The monitoring variable, in particular, its temporal behavior is graphically displayed by means of an output unit 6. The wear can be assessed and operating disturbances can be detected on the basis of the temporal behavior of the monitoring variable. Wear is understood here to mean the changes which are caused by operation and which generally progress slowly, for example, in the shaft bearing or in the shaft seal of the turbine 2 as well as e.g., deposits in lines or contaminations of filters. operating disturbances can, for example, be dropouts or faulty functioning of one of the sensors 31–3n or of the actuators monitored by them (e.g. valves, control flaps) or disturbances in the plant 1 or of the component 2 such as, for example, changes of vibrations or overheating of bearings or seals.

Furthermore, a warning apparatus 7 for triggering an alarm is provided in the exemplary embodiment illustrated in FIG. 1. This warning apparatus is activated in the event that the monitoring variable departs from a predeterminable normal region. The alarm can, for example, be given optically and/or acoustically.

Figure 2:
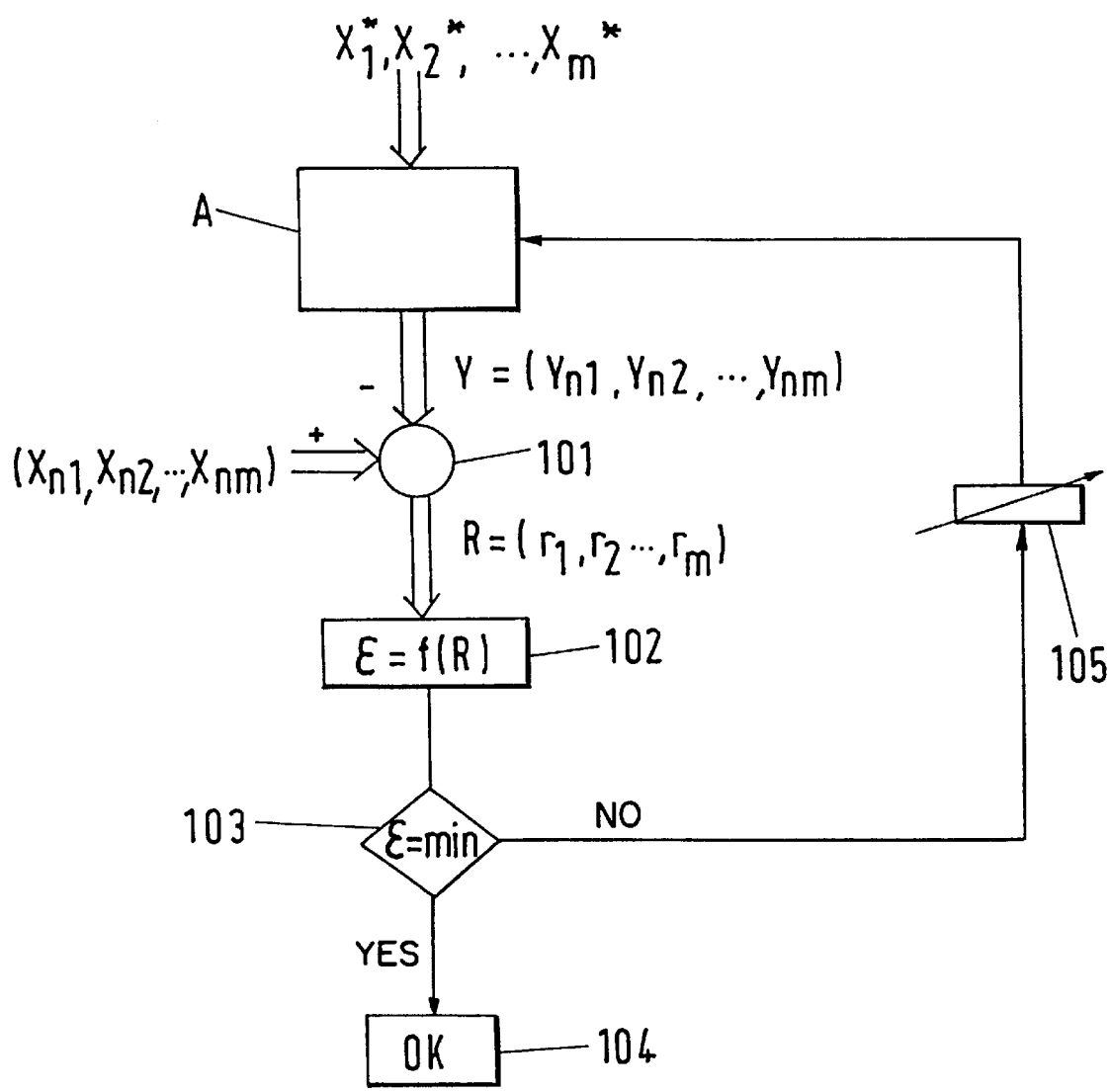
FIG. 2 is a flow chart for illustrating the modelling phase of an exemplary embodiment of the method in accordance with the invention.

In the following, the generation of the model A for the operating behavior will be explained in more detail with reference to the flow chart in FIG. 2. The model A is a model directly from experimental data, which means from the measured values $x_{it}$ for the parameters $x_i$ which are determined by means of the sensors 31–3n. Those measured values $x_{it}$ which are determined during a modelling phase are used for the generation of the model A. Here, the modelling phase designates a temporally limited operating period of the component 2 or of the plant 1 during which the plant 1 is working in normal, that is, disturbance-free operation. The choice of the modelling phase can be made on the basis of experience.

For example, after the plant has been put into operation, one waits until typical running-in processes have been completed. The modelling phase is chosen to have a duration such that it comprises a plurality of different working points in the operating region of the component 2. During the modelling phase, measured values $x_{it}$ for the parameters $x_i$ are collected. These measured values $x_{it}$ relate, among other things, to several different working points. Since the time interval between the determinations of the measured values, that is the time between the measurement t and the measurement t+1, can be relatively short, it is advantageous where appropriate to temporally average several values for a parameter $x_{it}$ which are measured in temporal succession or to combine them in some other manner by means of known statistical methods, for example, by forming correlation matrices. In order to make this explicit, the index T will be used in the following instead of the index t in order to indicate that the corresponding value can also represent the combination of several individual values. Thus, e.g. the measured values will be designate by $x_{iT}$ in the following.

At least one of the parameters $x_i$ is selected from the set X of parameters, for which a model value $y_i$ is determined by means of the model A. At least a portion of the set X of parameters $x_i$ is used as input variables of the model A. For the sake of simplicity, the case in which precisely one of the parameters $x_i$ is the output value of the model A and the remaining n−1 parameters are the input values of the model A is explained in the following in an exemplary manner. It is, however, self evident that the model A can be designed analogously in such a manner that its output values comprise model values for more than one of the parameters $x_i$. In principle, it is irrelevant which of the parameters $x_i$ is chosen as input variables and for which of the parameters $x_i$ model values are determined. From a practical point of view, however, it is advantageous if the input variables are parameters $x_i$ which can be directly influenced by the operating personnel, e.g., the flow rate through the turbine supply line, and the output values are parameters $x_i$ which cannot be directly influenced, e.g., the temperature of the shaft bearing or of the shaft seal.

Without restricting the generality, the parameter to be modelled in the exemplary embodiment described here is that with the index n, which means that the output value of the model is the model value $y_n$ for the parameter $x_n$. The remaining parameters $x_i$ with i=1, 2, . . . , n−1 are the input variables of the model A.

During the modelling phase a total of m sets $X_T$ (with T=1, 2, . . . , m) of measured values are stored in the evaluation and storage apparatus 5 for the set $X=(x_1, x_2, X_3, \ldots, x_n)$ of parameters, with the index T indexing the measured value sets $X_T$ which arise in time sequence. Thus, measured values are present for a total of m times or time intervals respectively. Each set of measured values $X_T=(x_{1T}, x_{2T}, \ldots, x_{nT})$ thus contains for each parameter $x_i$ (with i=1, 2, . . . , n) the measured value $x_{iT}$ which the parameter $x_i$ had at the time T. The measured value sets $X_T$ which no longer contain the measured value $x_{nT}$ for the parameter $x_n$ are designated by $X^*_T$ (see FIG. 2). Thus, one has: $X^*_T=(x_{1T}, x_{2T}, \ldots x_{(n-1)T})$ with T=1, 2, . . . , m).

In the simplest case a linear statistical model structure which for example, has the following form:

$$x_n = a_o + \sum_{i=1}^{n-1} a_i \cdot x_i$$

is chosen as the model structure for the model A, with the quantities $a_i$ for i=0, 1, 2, . . . , n−1 being model parameters.

The m sets $X_T$ of measured values yield m determining equations for the n model parameters $a_i$. Since as a rule, the number m of the sets of measured values is greater than the number n of the model parameters $a_i$, the system of determining equations is overdetermined. Enough mathematical methods are, however, known in order to determine the best possible values for the model parameters $a_i$ by means of the determining equations. Suitable, for example, are methods of compensation calculations, the method of least squares, the method of singular value decomposition (SVD) or of principal component analysis (PCA). Since such methods are sufficiently known they will not be explained in further detail here.

For each set of measured values $X^*_T$ the associated model value $y_{nT}$ is now determined by means of the model A in accordance with the relationship:

$$y_{nT} = a_o + \sum_{i=1}^{n-1} a_i \cdot x_{iT} \qquad T=1, 2, \ldots, m.$$

The $Y_{nT}$ form a set of model values $(y_{n1}, y_{n2}, \ldots y_{nm})$, with $y_{nT}$ being the model value for the parameter $x_n$ for the time T. In step 101 (see FIG. 2) the model values ynT are compared with the actual measured values $x_{nT}$ for the parameter $x_n$ corresponding to them and in each case a residue $r_T$ with T=1, 2, . . . , m is therefrom determined, which is a measure for the deviation of the model value $y_{nT}$ from the actual measured value $x_{nT}$. For example, the residues $r_T=x_{nT}-y_{nT}$ with T=1, 2, . . . , m are the differences of the actual measured values $x_{nT}$ and the model values $y_{nT}$. From the ensemble of the residues $R=(r_1, r_2, \ldots, r_m)$ a modelling error $\epsilon$ is determined in step 102 which is a measure for the quality of the model. The modelling error $\epsilon$ can for example, be the normed sum of the squares of the residues.

In the following the model A is optimized, as shown by the steps 102, 103 and 105 in FIG. 2, by determination of the model parameters $a_i$ (step 105) and respective renewed determination of the modelling error $\epsilon$ (step 102) until the modelling error $\epsilon$ is a minimum or has dropped below a predetermined limit. If this has been achieved, then the model A is of sufficient quality for the monitoring (step 104).

Depending of the type of model structure and/or the method of determining the model parameters $a_i$ used the generation and the optimizing of the model A can be done in only one step or else in a plurality of steps. Thus, it is for example possible, in particular, in model structures which are linear in the model parameters $a_i$, to determine the model parameters in a single step in such a manner that the model A is already optimal. By means of the method of least squares or of the SVD method the system of determining equations for the model parameters $a_i$ can, for example, be solved in such a manner that the resulting values for the model parameters $a_i$ already represent an optimized solution. On the other hand, it is also possible that the generation of the model A and its optimizing are carried out in a plurality of successive steps, that is, first the model A is generated, from which initial values for the model parameters result, and then the model parameters are optimized in one or more steps until the modelling error is a minimum. An iterative procedure of this kind is usually necessary if the determining equations for the model parameters can not be solved analytically, e.g. if neural networks are used as the model structure.

After the model A has been generated and optimized on the basis of the measured values determined in the modelling phase, it is possible to determine a model value $y_n$ for the parameter $x_n$ for each of those combinations of values of the parameters $x_1, x_2, x_3, \ldots, x_{n-1}$ which correspond to a working point in the operating field of the component 2 or the plant 1 which specifies to a very good approximation what value the parameter $x_n$ should have if the component 2 or the plant 1 is working in normal, that is, disturbance free operation. In other words: the model A takes the momentary working point into account.

The following procedure, for example, is used for monitoring the plant. At predeterminable time intervals, for example, every several minutes, a set of measured values for the parameters $x_i$ with i=1, 2, . . . , n is determined by the sensors 31–3n and transmitted to the evaluation and storage apparatus 5. Here, either each set of measured values is evaluated individually or the sets of measured values are collected in each case over a period of time, e.g. a day, and then averaged or combined in some other manner. For example, correlations or cross correlations can also be determined. The model value $y_n$ is then determined by means of the model A from the measured values for the parameters $x_1, x_2, \ldots, x_{n-1}$. This model value is then subtracted from the corresponding actual measured value for the parameter $x_n$ and the residue r resulting therefrom, that is, the difference between the respective current measured value and the model value ye corresponding to it is determined as a monitoring variable. Because the model A takes the respective current working point into account, the monitoring variable, namely the residue r, is independent of the respective current working point. The monitoring variable is transmitted to the output unit 6 where the temporal behavior of the monitoring variable is displayed graphically, e.g. On a monitor.

As long as the component 2 or the plant 1 is working in normal, that is, disturbance free operation and no wear arises, then the monitoring variable is, independently of the respective current working point, substantially constant in time. If an operating disturbance arises, for example, a dropout of a sensor or an overheating, then this results in the model value, which describes the normal operation, deviating more strongly from the actual measured value. As a result, the monitoring variable changes, which is very simple to detect in its graphical display. Usually the occurrence of operating disturbances leads to a change in the monitoring variable which proceeds rapidly in time.

If slowly progressing changes arise in the plant 1 or component 2, such as are caused, for example, by wear, this becomes noticeable through a comparatively slower and continuous change in the temporal behavior of the monitoring variable.

It is also possible to specify threshold values for the monitoring variable which limit the normal range of the monitoring variable. If the threshold values are exceeded, an alarm, e.g. an optical and/or acoustical signal, is triggered or a warning is given through activation of the warning apparatus 7. Since the monitoring variable is independent of the respective current working point, such threshold values for the monitoring variable are equivalent to flexible threshold values for the parameters which are adapted to the respective working point.

The threshold value for the monitoring variable is preferably predetermined on the basis of the residues R=($r_1$, $r_2$, . . . , $r_m$) determined for the modelling phase because these fluctuations represent a typical measure of how strong the deviation between the model value and the corresponding measured value are in normal operation. For example, the threshold value for the monitoring variable can be chosen equal to or somewhat greater than the largest of the residues $r_1$, $r_2$, . . . , $r_m$ of the modelling phase.

The model structure for the model A can obviously also be different from the linear static one described. For example, the model structure can be a non-linear one in which e.g. products of the parameters appear. It is also possible to use a linear dynamic model structure e.g. of the following form:

$$x_{nT} = a_o + \sum_{i=1}^{n-1} a_i \cdot x_i + a_o \cdot x_{nT-1}$$

In this dynamic model structure, all parameters $x_i$ are used as input variables, with the value of the parameter $x_{nT}$ at an earlier point in time, $x_{nT-1}$, entering into the determination of the value of this parameter. For practical reasons, a model structure is preferably used which is linear in the model parameters $a_i$, since, in this case, the model parameters $a_i$ can normally be determined analytically.

It is however also possible to use neural networks as a model structure.

In the following, a further exemplary embodiment of the method in accordance with the invention in which an updating of the model occurs will be explained with reference to the flow chart in FIG. 3. Here as well, for the sake of simplicity, reference will be made with exemplary character to the case in which model values are calculated for only one of the parameters $x_i$, namely the parameter $x_n$. It is, however, evident that a plurality of parameters $x_i$ can be modelled analogously in this exemplary embodiment as well.

In order to avoid confusion with the modelling phase the index "u" is used in the following in order to designate the temporal sequence of the determined or assessed values (measured values, model values, models, residues). Thus, e.g. $x_{iu}$ designates the measured value which is determined for the parameter $x_i$ at a certain time designated by "u" and $x_{iu+1}$ the measured value which is determined for the same parameter $x_i$ at the next measurement. As has already been mentioned above, the measured values, which are, for example, determined every few minutes, can first be collected over a predeterminable period of time, e.g. a day, and then averaged and/or combined in a different manner, e.g. through the forming of cross correlations, before the subsequent steps of the process are taken. For such cases, $x_{iu}$ designates the measured value which is averaged or combined over this period designated by u. This means that no distinction will be made in the following as to whether each set of measured values is evaluated individually or whether time averaging over several sets of measured values is performed. This distinction is not essential to an understanding of the present teaching.

Figure 3:
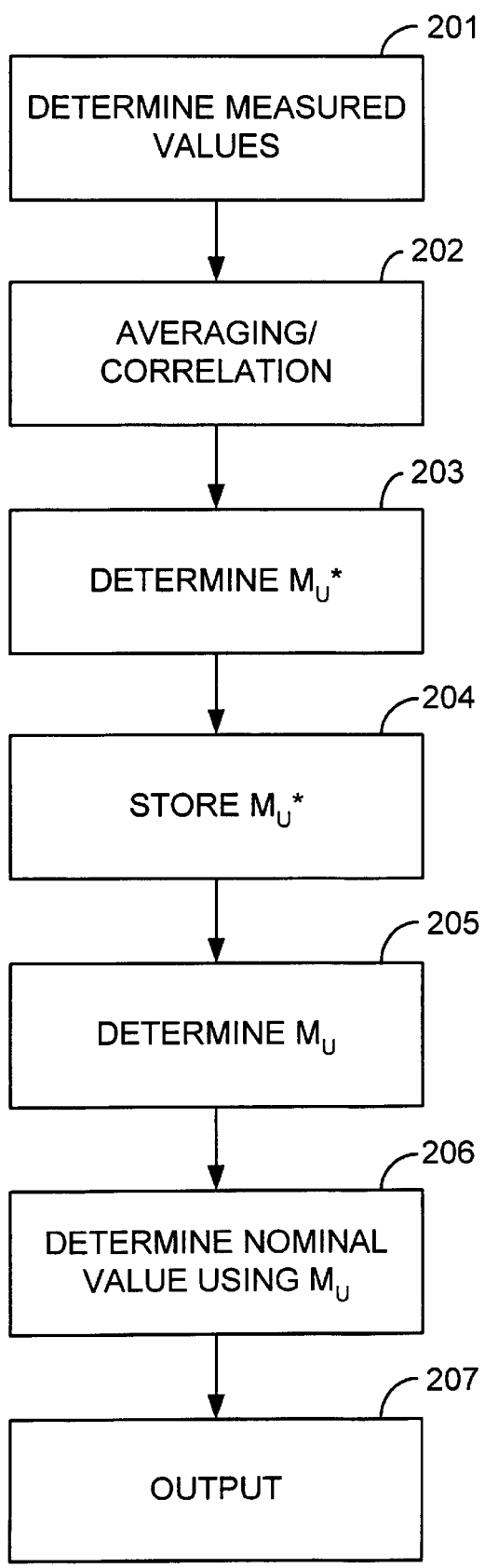
FIG. 3 is a flow chart for illustrating an exemplary embodiment in which an updating of the model takes place.

In the exemplary embodiment illustrated in FIG. 3, the model A is first generated and optimized on the basis of the measured values determined in the modelling phase in a manner analogous to that previously explained. The following explanations therefore relate only to the operation of the plant 1 after the modelling phase. Here as well, a set of measured values $x_{1u}$, $x_{2u}$, . . . $x_{nu}$ is determined in each case for the set of parameters $x_1$, $x_2$, $x_3$, . . . , $x_n$ (step 201) at predeterminable time intervals.

During the operation of the plant 1, the model A is updated at predeterminable time intervals by means of the evaluation and storage apparatus 5, which means that in each case a current model $M_u$ is determined (step 205) as will be explained below. By means of the respective current model $M_u$ a nominal value $s_{nu}$ for the parameter $x_n$ is determined in each case for at least one fixed reference working point (step 206) and serves as a monitoring variable which is transmitted to the output unit 6 (step 207). This means that in contrast to the exemplary embodiment described further above, the respective current model $M_u$ is always evaluated at the same reference working point independently of which working point the plant 1 or component 2 is momentarily working at. This fixed reference working point, which is defined by fixed values of the parameters $x_i$, is preferably chosen in such a manner that it lies approximately in the middle of the operating range of the plant 1 or component 2, e.g. at the best point, or in the vicinity of a working point at which the plant 1 or the component 2 frequently works or is operated.

The determination and optimization of the respective current model $M_u$ can, for example, be done in a manner analogous to that which is described above with reference to the generation of the model A from the measured values $x_{iT}$ of the modelling phase (see FIG. 1). This means that the updating is a new determination of the model on the basis of the set of measured values $x_{1u}$, $x_{2u}$, . . . $x_{nu}$. By means of the measured values $x_{1u}$, $x_{2u}$, . . . $x_{(n-1)u}$ the model value $y_{nu}$ for the parameter $x_n$ is determined with the help of the last current model $M_{u-1}$ or with the help of the newly determined model. Then the residue $r_{nu}=x_{nu}-y_{nu}$ is formed, which is the difference between the actual measured value $x_{nu}$ and the model value $y_{nu}$. In the following, this residue $r_{nu}$ is minimized or, in the event that a plurality of residues are determined, a modelling error which can be determined from the residues, e.g. the normed sum of the squares of the residues, is minimized. Here as well, as described above, the generation and optimizing of the current model $M_u$ can, where appropriate, be done in one step. Before the last current model $M_{u-1}$ is changed, that is, before the model is calculated anew, the associated model parameters of the model $M_{u-1}$ and a characteristic value which is representative of the quality of this model $M_{u-1}$, for example, correlation matrices and/or estimated variances of the measurement noise, are stored.

In the updating for the determination of the current model $M_u$ the older models, the model parameters and model uncertainties or qualities of which are stored, are preferably taken into consideration, in particular in a weighted manner. A preferred realization of this incorporation of older models is explained in the following with reference to the flow chart in FIG. 3.

After the measured values $x_{1u}, x_{2u}, \ldots x_{nu}$ have been determined in step 201 and have where appropriate been combined by averaging and/or by the forming of cross correlations (step 202), a model $M_u^*$ is generated in step 203 (e.g. in a manner analogous to that described above), which model $M_u^*$ is based only on those measured values $x_{1u}, x_{2u}, \ldots x_{un}$ which had been determined since the last updating. The symbol "*" is thus intended to indicate that only those measured values $x_{1u}, x_{2u}, \ldots x_{nu}$ were used for the generation of this model $M_u^*$ which were determined in the time interval indexed by u. Analogously $M_{u-1}^*$ designates the model for the generation of which the measured values $x_{1(u-1)}, x_{2(u-1)}, \ldots x_{n(u-1)}$ which were determined in the time interval indexed by (u−1) were used, etc.

In step 204 the model $M_u^*$ is stored in the evaluation and storage apparatus 5 (FIG. 1) together with characteristic values which are representative of its quality, for example, correlation matrices and/or estimated variances of the measurement noise.

In step 205 then the current model $M_u$ is determined, which takes into account the older models $M_{u-1}^*$, $M_{u-2}^*, \ldots$, for example, as a sum of the form:

$$M_u = M_u^* + \lambda M_{u-1}^* + \lambda^2 M_{u-2}^* + \ldots$$

where $\lambda$ designates a weighting factor or a forgetting factor. The weighting or forgetting factor $\lambda$ can, for example, be determined from the characteristic values which are in each case stored together with the models $M_{u-1}^*, M_{u-2}^*, \ldots$. An advantage of this determination of the current model $M_u$ is to be seen in the fact that the depth of memory of the current model, that is, the influence of the history on the respective current model $M_u$, can be influenced and varied via the factor $\lambda$. Thus, even in retrospect the respective current model $M_u, M_{u-1}, M_{u-2}, \ldots$ at each point in time can be varied, which means an enormous flexibility, which is particularly advantageous, in particular, in the retrospective analysis of the temporal development of operating disturbances.

After the current model $M_u$ has been determined and optimized, it is evaluated at the reference working point (step 206) and thus, the nominal value of $s_{nu}$ is determined as a monitoring variable and is transmitted to the output unit 6 (FIG. 1).

Alternatively, it is also possible to determine the respective current model $M_u$ in the following form:

$$M_u = M_u^* + \lambda M_{u-1}$$

In this form as well the respective current model $M_u$ takes into account the older models—thus the history—because the models $M_{u-1}^*$ and $M_{u-2}$ would then enter into the determination of the model $M_{u-1}$, with the models $M_{u-2}^*$ and $M_{u-3}$ entering into $M_{u-2}$, etc. This variant has the advantage of requiring particularly little memory area because the entire history (temporal development) is always described by one model only.

It is evident that variants different from that of the exponential forgetting described here are also suitable for taking the history into account. The updating for the determination of the respective current model $M_u$ is done regularly at predeterminable time intervals, for example, once a day. Naturally it is also possible to perform the updating quasi-continually, which means after each individual determination of the set of measured values for the parameters $x_i$.

In this exemplary embodiment, the monitoring variable is not a difference between a measured value and a model value, but the nominal value $s_{nu}$. This is the model value which results for the fixed reference working point from the respective current model $M_u$. Consequently, the monitoring variable $s_{nu}$ is also independent of the momentary working point in this execution of the method. It always relates to the fixed reference working point. Expressed differently, the monitoring variable $s_{nu}$ indicates which value the parameter $x_n$ would have if the plant 1 or the component 2 were working at the reference working point. It is obvious that the monitoring variable $s_{nu}$ is temporally substantially constant as long as the plant 1 or the component 2 is working in normal operation.

The updating of the model is carried out independently of whether an operating disturbance has arisen or not. If a change (disturbance, sensor dropout, wear) arises in the plant 1 or the component 2 to be monitored then this change is incorporated into the current model $M_u$ during the updating. Consequently, the current model $M_u$ then no longer represents the normal operation, but rather the operation modified by the disturbance and/or the wear. If the current model is now evaluated at the reference working point, then a nominal value $s_{nu}$ results which deviates from that of the normal operation. Among other things, a deviation from constant behavior shows up in the graphical display of the monitoring variable as a function of time. Here as well, operating disturbances result in a temporally relatively rapidly progressing change of the monitoring variable as a rule, whereas slowly progressing changes, such as are caused, for example, by wear, effect a comparatively slower and continuous change in the temporal behavior of the monitoring variable $s_{nu}$.

A particular advantage of this kind of monitoring, which is referred to a fixed reference working point, lies in the fact that it is also possible to recognize or to determine trends for the further operation of the component 2 or of the plant 1. This will be explained using the example of the wear of a seal. If the seal wears down continuously, then this leads for example, to a continuous growth in the temporal-behavior of the monitoring variable. Since the monitoring variable always relates to the same reference working point, it can thereby be predicted how long the seal will be capable of functioning. Maintenance work can thereby be planned in a significantly better manner and more efficiently, and surprising uneconomical dropouts in the operation arise significantly less often. For this reason, the maintenance and operating costs of plants for industrial uses can be considerably lowered by the method in accordance with the invention.

Naturally, a plurality of nominal values for different parameters can, in each case, be determined for the fixed reference working point. It is also possible to fix a plurality of reference working points at which the current model $M_u$ is in each case evaluated.

In a preferred further development of the method in accordance with the invention a fault isolation is performed in addition to the detection of deviations from the normal operating behavior, which means that the fault which has arisen is localized as well as possible. The goal of this fault isolation is to localize that parameter or that sensor 31–3n as well as possible which is responsible for the deviation from the normal operating behavior having arisen. If, for example, a bearing temperature serves as a monitoring variable, then an abnormality can e.g., on the one hand be caused by a faulty functioning of the corresponding sensor, but on the other hand also by an operating disturbance in a different region of the component or the plant, e.g. by an impermissible increase of the amount flowing through or by a faulty functioning of the sensor which measures the amount flowing through.

The fault isolation is preferably carried out as follows:

On the basis of the measured values which are determined for the parameters and/or of a global model, a plurality of partial models are generated which in each case have a lower model dimension than n−1, with n being the number of parameters $x_i$ which are determined. By means of the partial models, reconstructed values are determined for at least a portion of the parameters and for each partial model a reconstruction error is determined through respective comparison of the reconstructed values with the measured values for the parameters corresponding to them. By comparing the reconstruction error with predeterminable threshold values, at least one faulty parameter is isolated.

This isolation is to be clarified in the following with reference to a very simple example. In this example, n=4 parameters $x_1, x_2, x_3, x_4$ are determined by measurement and the model A for the operating behavior or the current model $M_u$ is determined as described above. A linear model structure is chosen, for example $$x_4 = a_o + a_1 x_1 + a_2 x_2 + a_3 x_3$$

Expressed mathematically, this equation describes a three dimensional hypersurface in a four dimensional space. Since it is no longer necessary for the following to distinguish between the input variables and the output variables of the model, this equation can also be represented in the form $$M(x_1, x_2, x_3, x_4) = 0,$$

with M being a function of the four parameters $x_1, x_2, x_3, x_4$ which represents the model or the current model respectively. The model dimension, which corresponds to the dimension of the hypersurface which is spanned in the n-dimensional space of the n parameters by the model for the operating behavior, is three in this example.

If it is now determined on the basis of the monitoring variable that an operating disturbance has arisen, then this is localized on the basis of the partial models. A partial model of this kind is distinguished by the fact that its model dimension is less by at least one than the model dimension of the model A or of the current model $M_u$. In the example being explained here two dimensional partial models are used, which means that the model dimension of the partial models is two. The following partial models can be determined:

$$m1(x_1,x_2,x_3);\ m2(x_1,x_2,x_4);\ m3(x_1,x_3,x_4);\ m4(x_2,x_3,x_4)$$

The partial model m1 has, for example, the form:

$$x_1 = b_o + b_1 x_2 + b_2 x_3,$$

with $b_o$, $b_1$ and $b_2$ designating model parameters. The parameter $x_4$ no longer enters into the partial model m1. In an analogous manner, the parameter $x_3$ no longer enters into the partial model m2, the parameter $x_2$ no longer enters into the partial model m3 and the parameter $x_1$ no longer enters into the partial model m4.

As already mentioned, it is not important for the partial models m1–m4 which of the parameters $x_i$ serve as input variables and which as output variables. Thus, it is possible, for example, using the partial model m1 to calculate the parameter x1 from the parameters $x_2$ and $x_3$, or the parameter $x_2$ from the parameters $x_1$ and $x_3$, or the parameter $x_3$ from the parameters $x_1$ and $x_2$. An analogous statement holds for the partial models m2, m3 and m4.

By means of the partial models m1–m4 values are now determined for the parameters $x_1$, $x_2$, $x_3$, $x_4$ which are designated as reconstructed values. Through respective comparison of the reconstructed values with the measured values $x_{iT}$ or $x_{iu}$ for the parameters $x_i$ corresponding to them, a reconstruction error is determined for each of the partial models m1–m4 which is representative for how well the reconstructed values which are determined by means of the associated partial model agree with the measured values. If the reconstruction error is greater than a predeterminable threshold value, then the associated partial model is designated as faulty, otherwise as not faulty. The threshold values for the reconstruction error can be predetermined, for example, on the basis of the residues which e.g. were determined in the modelling phase.

Thus, the partial models are divided into two classes: the faulty and the non-faulty. On the basis of the combinations of parameters $x_i$ which lead to faulty partial models, and of the combinations of parameters $x_i$ which lead to non-faulty partial models, then the fault-laden or faulty parameter can be determined.

This will be explained in the case of the mentioned example with four parameters. If e.g., the parameter $x_i$ is faulty, because, for example, the sensor 31 is not functioning correctly, then this generally leads to all partial models in which $x_i$ occurs, that is, the partial models m1, m2 and m3, being judged as faulty because their reconstruction error is too large. On the contrary, the partial model m4 will have the smallest reconstruction error and be judged as non-faulty because the parameter $x_1$ does not enter into this partial model m4.

Analogously, a fault in the parameter $x_2$ or of the sensor 32 leads to only that partial model into which $x_2$ does not enter, namely m3, being judged as non-faulty.

A fault in the parameter $x_3$ or of the sensor 33 leads to only the partial model m2 being judged as non-faulty, and a fault in the parameter $x_4$ or of the sensor 34 leads to only the partial model m1 being non-faulty.

In this manner, the fault can be localized on the basis of the partial models m1–m4, or, to put it more precisely, the faulty parameters or the faulty sensor can be isolated.

The procedure described here for the fault isolation can be extended in a simple manner to n parameters $x_i$ in general with i=1, 2, . . . , n. For n parameters $x_i$ the maximum model dimension for the operating behavior is n−1, which means that the model for the operating behavior determines an n−1 dimensional hypersurface in the n dimensional space of the n parameters. The partial models required for the fault isolation have, in each case, a model dimension d which is smaller than the model dimension n−1 of the model for the operating behavior, which means that d<n−1. Consequently, each partial model represents a d dimensional hypersurface in a d+1 dimensional space. Since the n parameters $x_i$ are generally highly correlated, and are thus not independent of one another, the model A or $M_u$ for the operating behavior is analytically redundant. On the basis of this analytical redundance, the faults can be isolated using the partial models.

The number of faulty parameters or of the faultily operating sensors which can be isolated by means of the partial models is equal to the difference between the model dimension of the model for the operating behavior and the model dimension of the individual partial models. For practical applications, it is frequently sufficient if this difference is one.

It will be understood that model structures different from the linear model structures mentioned here by way of example can also be used for the partial models. The preceding explanations with respect to the model structure of the model for the operating behavior also hold analogously for the partial models.

The generation of the individual partial models can, for example, be done in a manner analogous to the generation of the model for the operating behavior, that is, directly from the measured values for the parameters. Alternatively, however, the following procedure is also possible. First, a global model is generated, for example, by means of the SVD method, the model dimension of which is equal to the model dimension d of the partial models to be determined, with however all parameters $x_i$ with i=1, 2, . . . , n entering into this global model. This global model is consequently analytically redundant. Then, the individual partial models are determined by elimination of at least one of the parameters $x_i$ from the global model, which means that the global model is in each case projected onto a space of lower dimension. The mathematical methods of projection required for this are known per se and will not be explained here in further detail.

The determination of a suitable model dimension d for the partial models and for the global model can be done, for example, by means of the SVD method.

The determination, storage and evaluation of the partial models is preferably done in the evaluation and storage apparatus 5.

What is claimed is:

1. A method for monitoring plants with mechanical components that can be operated at variable working points, the method comprising:

determining measured values $(x_{iT}; x_{iU})$ during the operation of the components, the measured values being determined in each case at predeterminable time intervals for a fixed set of parameters $(x_i)$;

using the measured values $(x_{iT})$ that are determined during a modeling phase for various working points for the generation of a model (A) for the operating behavior of the components without determination of the physical relationships between the parameters, wherein the input variables of the model are at least a portion of the set of the parameters $(x_i)$ and the output values comprise a model value $(y_{nT})$ for at least one of the parameters $(x_n)$, wherein a residue $(r_T)$ is formed in each case through comparison of the respective model value $(y_{nT})$ with the corresponding actual measured value $(x_{nT})$ of the modeling phase, and wherein the model is optimized by termination of model parameters in such a manner that a modeling error (E) that is derivable from the residues $(r_T)$ is a minimum;

deriving at least one monitoring value $(r; s_{nu})$ at predeterminable time intervals, the at least one monitoring value being derived with the help of the model of the operating behavior and being independent of the respective current working point;

determining a threshold value for the monitoring value on the basis of the residues determined for the modeling phase; and using the temporal behavior of the monitoring value $(r; s_{nu})$ for estimating the wear in the components and/or the detection of operating disturbances.

2. A method in accordance with claim 1 further comprising storing the determined measured values $(x_{iT}; x_{iu})$ in an evaluation and storage apparatus, the generation and evaluation of the model taking place in the evaluation and storage apparatus, and wherein a warning apparatus is activated for the triggering of an alarm in the event that the monitoring value $(r; s_{nu})$ departs from a predeterminable normal region.

3. A method in accordance with claim 1 wherein the monitoring value (r) is the difference between the respective current measured value $(x_n)$ and the model value $(y_n)$ corresponding to it.

4. A method in accordance with claim 2 wherein an updating takes place at predeterminable time intervals by means of the evaluation and storage apparatus for the determination of a current model $(M_u)$ in which the measured values $(x_{iu})$ that were determined since the last updating of the model are taken into consideration.

5. A method in accordance with claim 4 wherein certain models $(M_u, M_{u-1}, M_{u-2})$ that were determined at different times were stored in the evaluation and storage apparatus in each case together with characteristic values that are representative of the quality of the respective model.

6. A method in accordance with claim 5 wherein older models $(M_u, M_{u-1}^*, M_{u-2}^*)$ are taken into consideration in the updating for the determination of the current model $(M_u)$.

7. A method in accordance with claim 6 wherein the older models are taken into consideration in a weighted manner.

8. A method in accordance with claim 4 wherein the respective current model $(M_u)$ is optimized by means of the evaluation and storage apparatus and for the measured values $(x_{iu})$ that were determined since the last updating of the model, wherein a residue is calculated for the associated parameter $(x_i)$ through comparison with the model values corresponding to them in each case, and wherein the model parameters are predetermined in such a manner that the modeling error that can be determined from the residues is a minimum.

9. A method in accordance with claim 4 wherein at least one reference working point is fixed, wherein after each updating of the model, the associated model value is determined for the fixed reference working point by means of the respective current model $(M_u)$ of the associate model value as a nominal value $(s_{nu})$ for the corresponding parameter $(x_n)$ by the evaluation and storage apparatus, and wherein the temporal behavior of the nominal value $(s_{nu})$ is used for the estimation of the wear in the components and/or for the detection of disturbances in the operation.

10. A method in accordance with claim 9 further comprising determining in each case, a plurality of nominal values for different parameters $(x_i)$ for the fixed reference working point.

11. A method in accordance with claim 1 further comprising carrying out a fault isolation in the event of a deviation from normal operating behavior, wherein a plurality of partial models, $(m_1, m_2, m_3, m_4)$ are generated on the basis of the measured values determined for the parameters and/or of a total model, each of which has a model dimension (d) smaller that n−1, with n being the number of the parameters $(x_i)$ determined;

wherein reconstructed values for at least a portion of the parameters ($x_i$) are determined by means of the partial models ($m_1$, $m_2$, $m_3$, $m_4$);

wherein a reconstruction error is determined through respective comparison of the reconstructed values with measured values for the parameters ($x_i$) corresponding to them for each partial model ($m_1$, $m_2$, $m_3$, $m_4$);

and wherein at least one faulty parameter is isolated through comparison of the reconstruction errors with predeterminable threshold values.

12. A method in accordance with claim 11, wherein the partial models ($m_1$, $m_2$, $m_3$, $m_4$), that have reconstruction errors greater than the predeterminable threshold value are rated as faulty; and wherein the faulty parameter or the faulty parameters are isolated on the basis of the combinations of parameters ($x_i$) that lead to faulty partial models and the combinations of parameters ($x_i$) that lead to non-faulty models.

* * * * *